(12) United States Patent
Mukou et al.

(10) Patent No.: US 9,849,597 B2
(45) Date of Patent: Dec. 26, 2017

(54) SUCTION-TYPE HAND FOR DRAWING AND HOLDING WORKPIECE

(71) Applicant: FANUC CORPORATION, Yamanashi (JP)

(72) Inventors: Hiroshi Mukou, Yamanashi (JP); Yoshinori Ochiishi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/341,422

(22) Filed: Nov. 2, 2016

(65) Prior Publication Data

US 2017/0129109 A1 May 11, 2017

(30) Foreign Application Priority Data

Nov. 9, 2015 (JP) ................................. 2015-219440

(51) Int. Cl.
*B25J 15/06* (2006.01)
*B66C 1/02* (2006.01)
*B25J 15/00* (2006.01)

(52) U.S. Cl.
CPC ....... *B25J 15/0616* (2013.01); *B25J 15/0052* (2013.01); *B66C 1/0243* (2013.01)

(58) Field of Classification Search
CPC . B25J 15/0616; B25J 15/0052; B66C 1/0237; B66C 1/0243; B66C 1/025; B66C 1/0262; B66C 1/0287; B65G 47/918
USPC .......................................................... 294/65
See application file for complete search history.

(56) References Cited

U.S. PATENT DOCUMENTS

| 2,729,040 | A | * | 1/1956 | Wallace | B23Q 1/032 |
| | | | | | 269/21 |
| 2,941,799 | A | * | 6/1960 | Reincke | B65H 3/46 |
| | | | | | 271/92 |
| 3,519,303 | A | * | 7/1970 | Gille | B66C 1/0212 |
| | | | | | 294/81.1 |
| 4,527,783 | A | * | 7/1985 | Collora | B23Q 1/032 |
| | | | | | 269/21 |
| 4,746,348 | A | * | 5/1988 | Frank | C03B 23/0305 |
| | | | | | 65/104 |

(Continued)

FOREIGN PATENT DOCUMENTS

DE 2529431 * 1/1977
JP H05092385 A 4/1993

(Continued)

OTHER PUBLICATIONS

Notification of Reasons for Refusal for Japanese Application No. 2015-219440, dated Oct. 16, 2017, including English translation, 4 pages.

*Primary Examiner* — Dean J Kramer
(74) *Attorney, Agent, or Firm* — RatnerPrestia

(57) ABSTRACT

A suction-type hand according to the present invention includes a base part, a plurality of linear drive devices successively arranged in the base part, a plurality of link parts, which are each connected to the corresponding one of movable parts of the linear drive devices and which are moved closer to or moved away from the base part in response to the movement of the movable parts, a plurality of joint parts for connecting the plurality of link parts in series, and rotatably supporting the link parts, and a plurality of suction parts for drawing and holding a workpiece, which are each supported by the corresponding one of the plurality of link parts.

4 Claims, 3 Drawing Sheets

(56) References Cited

U.S. PATENT DOCUMENTS

| | | | | |
|---|---|---|---|---|
| 8,025,323 B2* | 9/2011 | Ransom | ............... | B25J 15/0052 |
| | | | | 294/65 |
| 2014/0199153 A1* | 7/2014 | Reinhold | ............. | B65H 3/0816 |
| | | | | 414/800 |
| 2014/0237793 A1* | 8/2014 | Gamboa | .............. | B23Q 9/0042 |
| | | | | 29/426.2 |

FOREIGN PATENT DOCUMENTS

| | | |
|---|---|---|
| JP | 2000-79590 A | 3/2000 |
| JP | 2007-221031 A | 8/2007 |
| JP | 2010253596 A | 11/2010 |

\* cited by examiner

SUCTION-TYPE HAND FOR DRAWING AND HOLDING WORKPIECE

BACKGROUND OF THE INVENTION

1. Field of the Invention

The present invention relates to a suction-type hand for drawing and holding a workpiece. In particular, the present invention relates to a suction-type hand for drawing and holding a workpiece to be transferred, which is used in an industrial robot.

2. Description of the Related Art

Suction-type hands for drawing and holding a workpiece have been known as robot hands used in industrial robots. In particular, suction-type hands for drawing and holding a workpiece by a suction part having suction holes through which a vacuum generator sucks air have been conventionally proposed.

For example, Japanese Patent Application Laid-open Nos. 2000-079590 and 2007-221031 disclose a suction-type hand in which suction parts for drawing and holding a workpiece are arranged in a plane. However, when the surface of the workpiece is curved, gaps are developed between the surface of the workpiece and the suction parts, and accordingly, a vacuum suction force of each suction part does not act upon the surface of the workpiece. In short, the suction-type hands disclosed in Japanese Patent Application Laid-open Nos. 2000-079590 and 2007-221031 cannot draw or hold a workpiece having a curved surface.

In order not to develop the gaps described above when a workpiece having a curved surface is drawn and held, it is necessary to move the suction parts so that the suction parts are positioned along and in contact with the curved surface of the workpiece. FIG. 5 is a view illustrating an example of the structure of a conventional hand capable of drawing and holding a workpiece having a curved surface.

A conventional hand 100 shown in FIG. 5 is provided with suction parts 102 functioning as a plurality of link parts which are coupled to one another via joint parts 101. Each joint part 101 has a rotary axis (not shown) for rotatably supporting the corresponding one of the suction parts 102. Each rotary axis extends in the same direction (the direction perpendicular to the paper surface on which FIG. 5 is shown). The rotation of suction parts 102 around the rotary axes of the joint parts 101 causes the suction parts 102 to be positioned along and in contact with the curved surface having a predetermined radius of curvature.

However, when the workpiece having a curved surface is a workpiece having a low rigidity, such as a thin plate, it is necessary to prevent the thin plate from becoming bent and deformed by the fact that the suction parts 102 draw and hold the thin plate and are maintained in position. For this object, a method, in which a motor is coupled to the rotary axis of each joint part 101 and the position of each suction part 102 is maintained by the torque of the motor, has been considered.

However, when the position of each suction part 102 is maintained by the torque of the motor, new problems that will be described below arise. When, for example, a workpiece is relatively long in one direction, it is necessary to extend each suction part 102 in the longitudinal direction of the workpiece, to enhance a vacuum suction force acting on the workpiece. This increases moment acting on the motor, and increases the torque required for the motor. Consequently, the size and weight of the motor may increase, and the weight and cost of the hand 100 may increase.

SUMMARY OF THE INVENTION

The present invention provides a suction-type hand capable of drawing and holding a workpiece having a curved surface, in which the increase of the weight or cost of the hand can be reduced.

According to a first aspect of the present invention, there is provided a suction-type hand including a base part, a plurality of linear drive devices successively arranged in the base part, a plurality of link parts, which are each connected to the corresponding one of movable parts of the linear drive devices and which are moved closer to or moved away from the base part in response to the movement of the movable parts, a plurality of joint parts for connecting the plurality of link parts in series, and rotatably supporting the link parts, and a plurality of suction parts for drawing and holding a workpiece, which are each supported by the corresponding one of the plurality of link parts.

According to a second aspect of the present invention, in the suction-type hand according to the first aspect, the linear drive devices have braking devices for stopping the movable parts.

According to a third aspect of the present invention, in the suction-type hand according to the first or second aspect, the linear drive devices have air cylinders for linearly driving the movable parts.

According to a fourth aspect of the present invention, in the suction-type hand according to the first aspect, the linear drive devices have servomotors and rotation-linear motion converting mechanisms for converting the rotation of the servomotors to the linear motion of the movable parts.

BRIEF DESCRIPTION OF THE DRAWINGS

These objects, features, and advantages of the present invention and other objects, features, and advantages will become further clearer from the detailed description of typical embodiments illustrated in the appended drawings.

DETAILED DESCRIPTION

Figure 1:
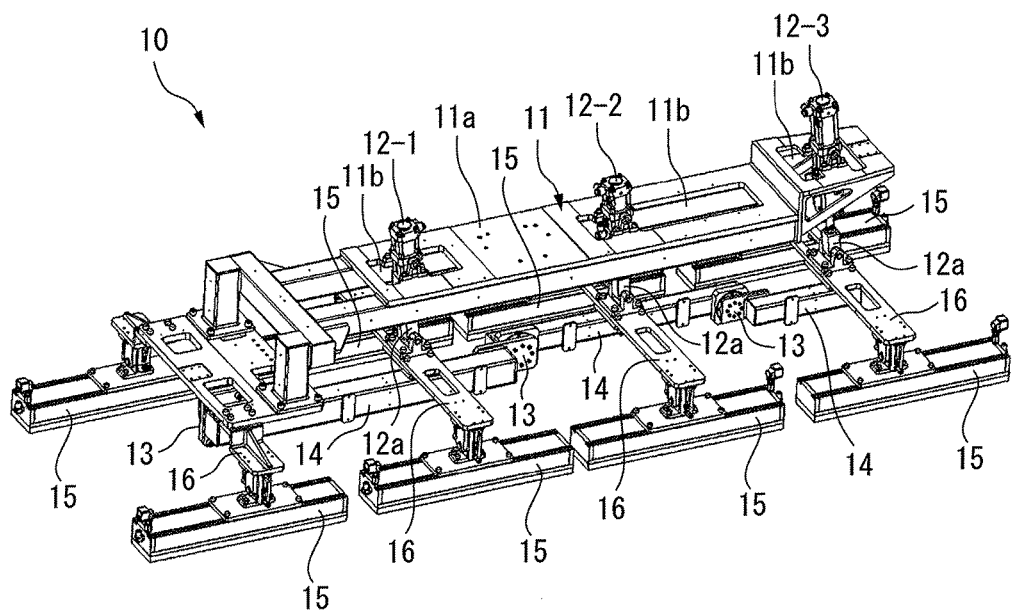
FIG. 1 is a perspective view of an embodiment of a suction-type hand according to the present invention.

Embodiments of the present invention will be described below with reference to the drawings. In the following figures, similar members are designated with the same reference numerals. The members in the different figures, which are designated with the same reference numerals, represent components having the same function. These figures are properly modified in scale to assist the understanding thereof. Note that, in the following embodiments, a suction-type hand used as a robot hand of an industrial robot will be described. However, the suction-type hand according to the present invention can be used for any machines or devices for transferring a workpiece.

Figure 2:
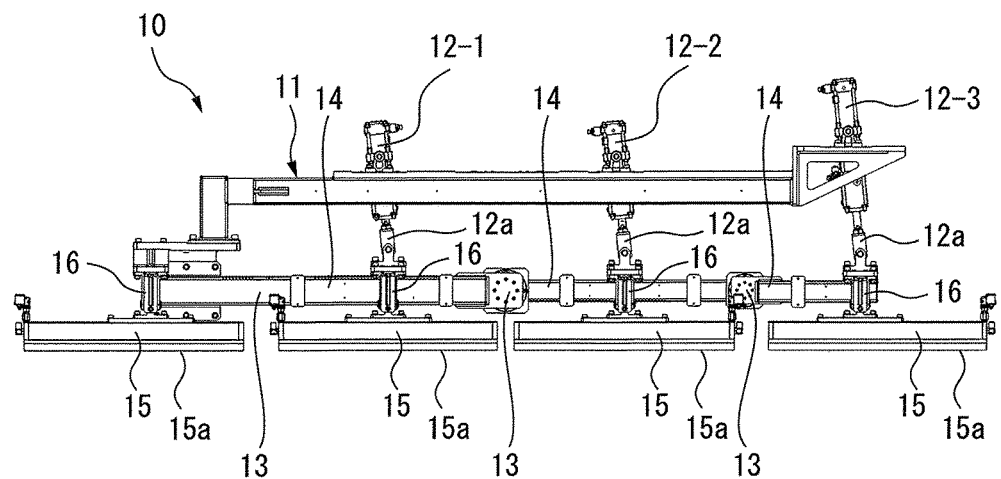
FIG. 2 is a side view of an embodiment of a suction-type hand according to the present invention.

FIG. 1 is a perspective view of an embodiment of a suction-type hand according to the present invention. FIG. 2 is a side view of an embodiment of a suction-type hand according to the present invention.

With reference to FIGS. 1 and 2, a suction-type hand 10 according to the present embodiment is provided with a base part 11 which can be attached to a robot arm part (not shown), and a plurality of linear drive devices 12-1 to 12-3 successively arranged on the base part 11.

The hand 10 is provided with a plurality of link parts 14, each of which is connected to the corresponding one of movable parts 12a of the linear drive devices 12-1 to 12-3, and is moved closer to or moved away from the base part 11 in response to the movement of the corresponding one of the movable parts 12a.

The hand 10 is also provided with a plurality of joint parts 13, which connect the link parts 14 in series and which rotatably support the link parts 14, and a plurality of suction parts 15 supported by the corresponding link parts 14 via connection members 16.

More specifically, the base part 11 is shaped like a long plate. A mount part 11a for attaching the base part 11 to the robot arm part is provided at a predetermined position on the top face of the base part 11, for example, a substantially middle portion of the base part 11 in the longitudinal direction.

A plurality of opening parts 11b are formed in the base part 11. The opening parts 11b are spaced at a predetermined distance, and are successively arranged in the longitudinal direction of the base part 11. The linear drive devices 12-1 to 12-3 are mounted in the corresponding opening parts 11b. In this respect, the linear drive devices 12-1 to 12-3 are secured in the corresponding opening parts 11b of the base part 11 so that the movable parts 12a of the linear drive devices 12-1 to 12-3 can move closer to and move away from the bottom face of the base part 11.

Figure 3:
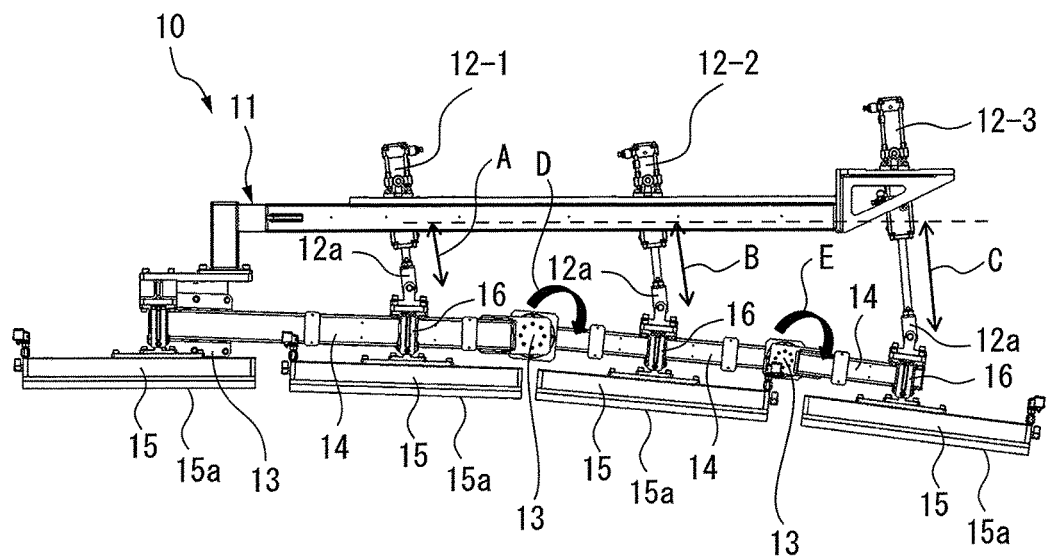
FIG. 3 is a view illustrating the movement of the hand shown in FIG. 2.
Figure 4:
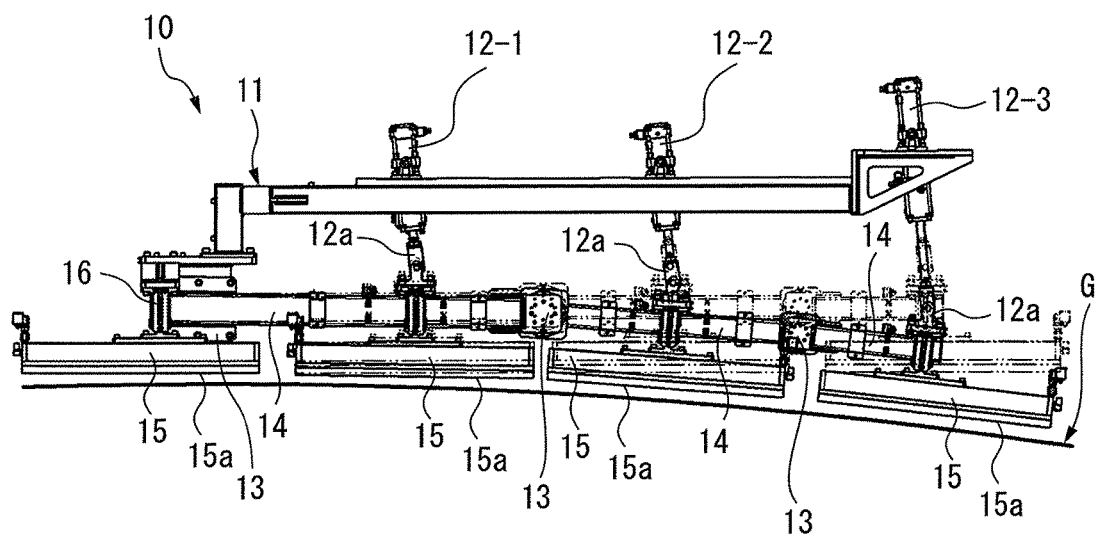
FIG. 4 is a view illustrating the state of the hand shown in FIG. 2, in which suction parts are positioned along and in contact with the curved surface of a workpiece.
Figure 5:
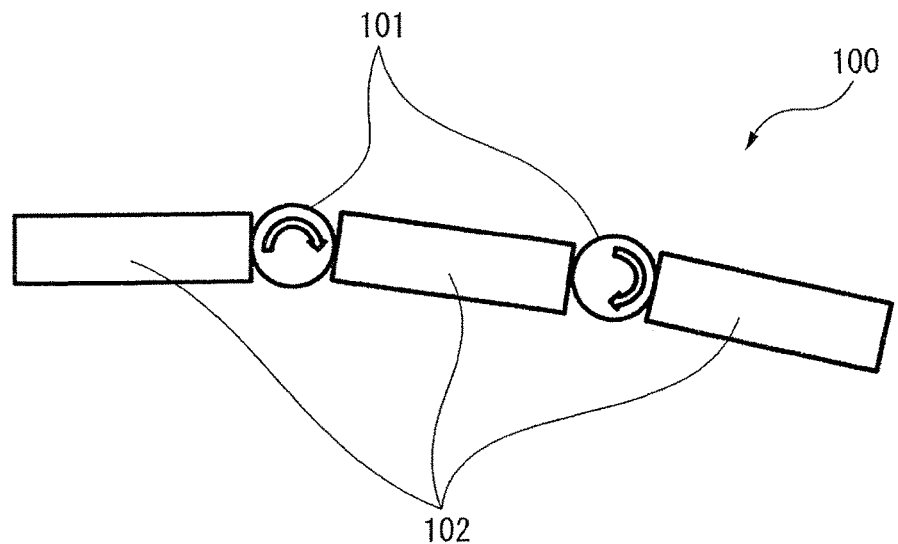
FIG. 5 is a view illustrating an example of the structure of a conventional hand capable of drawing and holding a workpiece having a curved surface.

The link parts 14 are long and substantially cuboid-shaped parts. The joint parts 13 connect the link parts 14 in series. Each joint part 13 has a rotary axis (not shown) for rotatably supporting the corresponding link part 14. Such a rotary axis of each joint part 13 extends in a direction substantially perpendicular to the longitudinal direction of the base part 11 and the moving direction of the movable parts 12a (a direction perpendicular to the paper surfaces on which FIGS. 2 to 4 are shown, which will be described later). As described above, the movable parts 12a of the linear drive devices 12-1 to 12-3 are connected to the corresponding link parts 14 via the corresponding connection members 16.

At least one suction part 15 is supported by each link part 14 via the corresponding connection member 16.

Each suction part 15 has an abutting surface 15a (see FIG. 2) to be abutted with the surface of a workpiece to be transferred by the hand 10. Suction holes (not shown) for sucking air are formed in each abutting surface 15a. The suction parts 15 can draw and hold a workpiece by abutting the abutting surfaces 15a of the suction parts 15 with the surface of the workpiece, and causing a vacuum generator (not shown) to sucking air by vacuum suction from the suction holes of the suction parts 15.

As shown in FIG. 2, the suction parts 15 are connected to the connection members 16 so that the abutting surfaces 15a face the side opposite to the side facing the connection members 16. The suction parts 15 are long and substantially cuboid-shaped parts in a fashion similar to the link parts 14.

The suction parts 15 are successively arranged in series along the direction of arrangement of the link parts 14 so that the longitudinal direction of the suction parts 15 coincides with the direction of arrangement of the link parts 14.

Air cylinders are applied to the linear drive devices 12-1 to 12-3. However, any devices, which can linearly move the movable parts 12a, can be applied to the linear drive devices 12-1 to 12-3. For example, servomotors may be applied to the linear drive devices 12-1 to 12-3.

When servomotors are applied to the linear drive devices 12-1 to 12-3, it is preferable that each of the linear drive devices 12-1 to 12-3 has a rotation-linear motion converting mechanism for converting the rotation of each servomotor to a linear motion. It has been considered that, for example, a mechanism in which a feed screw is engaged with a linear guide is used as the rotation-linear motion converting mechanism, and the rotary axis of a servomotor is coupled to the feed screw, to cause the servomotor to rotate the feed screw, so that the linear guide is linearly moved as the corresponding movable part 12a. Alternatively, a mechanism in which a part of a timing belt is engaged with a linear guide is used as the rotation-linear motion converting mechanism, and a servomotor rotates a pulley around which the timing belt is wound, so that the linear guide is linearly moved as the corresponding movable part 12a. Of course, the other types of rotation-linear motion converting mechanisms may be used.

In the present embodiment, the amounts of linear movement of the movable parts 12a of the linear drive devices 12-1 to 12-3 relative to the same position are different from one another. In this respect, FIG. 3 is a view illustrating the movement of the hand 10 shown in FIG. 2. As shown in FIG. 3, the amounts of linear movement of the movable parts 12a are defined by arrows A to C. In FIG. 3, the linear movement amounts A, B, and C in present embodiment are defined so as to satisfy a magnitude relationship of A<B<C.

In this regard, in order to easily set and change the linear movement amounts A, B, and C of the linear drive devices 12-1 to 12-3, it is preferable that the linear drive devices 12-1 to 12-3 have a configuration that will be described below.

Namely, when air cylinders are applied to the linear drive devices 12-1 to 12-3, it is preferable that the linear drive devices 12-1 to 12-3 have mechanical braking devices (not shown) for stopping the movable parts 12a connected to the tip ends of piston rods of the air cylinders. Specifically, it is preferable, immediately after the amount of movement or the position of the target movable part 12a is detected by a sensor, such as a linear sensor or a limit switch, to cause the braking device to act on the target movable part 12a, to secure the position of the movable part 12a. As the mechanical braking devices, devices for braking the movable parts 12a by pressing or sandwiching each movable part 12a are considered.

When servomotors are applied to the linear drive devices 12-1 to 12-3 as described above, it is preferable to monitor the rotational position of a servomotor, which corresponds to the position of the target movable part 12a, using a position detector such as an encoder, and to control the servomotor so that a signal detected by the position detector reaches a target value.

According to the linear drive devices 12-1 to 12-3 described above, the linear movement amounts A, B, and C of the linear drive devices 12-1 to 12-3 can easily be set and changed.

FIG. 4 is a view illustrating the state of the hand 10 shown in FIG. 2, in which the suction parts 15 are positioned along and in contact with the curved surface of a workpiece. With reference to FIGS. 1 to 4, the movement of the hand 10 in the present embodiment will be described. In particular, the movement of the hand 10 when drawing and holding a workpiece having a curved surface will be described.

As shown in, for example, FIG. 3, when the linear movement amounts A, B, and C satisfy a magnitude relationship of A<B<C, the linear movement amounts A, B, and C have values, each of which is greater than the former in order from one side to the other side of the base part 11 (from the left side to the right side in FIG. 3). In this respect, the amount of movement of the link part 14 moved by the linear drive device 12-2 is larger than the amount of movement of the link part 14 moved by the linear drive device 12-1. Further, the amount of movement of the link part 14 moved by the linear drive device 12-3 is larger than the amount of movement of the link part 14 moved by the linear drive device 12-2. In this instance, as designated by arrows D and E in FIG. 3, the link parts 14 rotate around the corresponding rotary axes (not shown) of the joint parts 13. Such rotations of the link parts 14 cause the suction parts 15 to move. Consequently, the abutting surfaces 15a of the suction parts 15 in the longitudinal direction of the base part 11 are positioned along and in contact with the surface having a predetermined radius of curvature.

When a workpiece having a curved surface G is drawn and held by the hand 10 as shown in FIG. 4, the linear movement amounts A, B, and C of the linear drive devices 12-1 to 12-3 are previously set in accordance with the position of the curved surface G of the workpiece. Thus, when the linear drive devices 12-1 to 12-3 are driven, the abutting surfaces 15a of the suction parts 15 in the longitudinal direction of the base part 11 can be positioned along and in contact with the curved surface G of the workpiece. Note that the method for changing the linear movement amounts A, B, and C has been described above.

In the present embodiment, not only the convexly curved surface G shown in FIG. 4 but also a concavely curved surface can be drawn and held by separately changing the linear movement amounts A, B, and C. Further, a surface having a convexly curved surface and a concavely curved surface can be drawn and held by increasing the number of the link parts 14 and linear motion driving devices for driving them.

The hand 10 described above produces the following effect.

In the present embodiment, the link parts 14 are connected to the corresponding movable parts 12a of the linear drive devices 12-1 to 12-3 secured to the base part 11, and the suction parts 15 are supported by the corresponding link parts 14. This structure enables the movable parts 12a of the linear drive devices 12-1 to 12-3 to rotate the corresponding link parts 14, to move the corresponding abutting surfaces 15a of the suction parts 15 to the surface of a workpiece, and enables the position of the suction parts 15 to be easily maintained. Thus, even when the workpiece having a curved surface is, for example, a workpiece having a low rigidity, such as a thin plate, the workpiece can be drawn and held without becoming deformed.

Further, there is no necessity that motors should be coupled to the rotary axes of the joint parts 13 to maintain the position of the suction parts 15, and accordingly, the increase of the weight and cost of the hand 10 can be reduced. Further, when a workpiece is relatively long in one direction, if the suction parts 15 are long in the longitudinal direction of the workpiece, the size and weight of the joint parts 13 would not increase.

Further, when the linear drive devices 12-1 to 12-3 move the suction parts 15 to the surface of a workpiece, braking devices secure the position of the movable parts 12a of the linear drive devices 12-1 to 12-3, and therefore, the position of the suction parts 15 can be maintained at the corresponding position on the surface of the workpiece.

Further, the use of air cylinders in the linear drive devices 12-1 to 12-3 enables the movable parts 12a to move easily in a linear direction. Furthermore, allowing the braking devices to stop the movable parts 12a connected to the tip ends of piston rods of the air cylinders enables the amounts of linear movement of the movable parts 12a to be set and changed. Thus, the positions of the suction parts 15, which are associated with the movement of the movable parts 12a, can be changed to any position.

Even when servomotors combined with rotation-linear motion converting mechanisms are used in the linear drive devices 12-1 to 12-3 as described above, the positions of the movable parts 12a can be set and changed in accordance with the rotational positions of the servomotors, and accordingly, the positions of the suction parts 15 can be changed to any position.

Although the present invention has been described above with reference to FIGS. 1 to 4, the present invention is not limited to the configuration of the hand 10 shown in FIGS. 1 to 4.

Thus, the number, shape, etc. of the linear drive devices 12-1 to 12-3, the joint parts 13, the link parts 14, and the suction parts 15, which constitute the hand 10 shown in FIGS. 1 to 4, are examples, and are not limited to the configurations shown in the drawings.

The present invention has been described above using exemplary embodiments. However, a person skilled in the art would understand that the aforementioned modifications and various other modifications, omissions, and additions can be made without departing from the scope of the present invention.

Effect of the Invention

According to the first aspect of the present invention, movable parts of linear drive devices rotate link parts, to move suction parts to the surface of a workpiece, and the position of the suction parts can be easily maintained. Thus, even when a workpiece having a curved surface is, for example, a workpiece having a low rigidity, such as a thin plate, the workpiece can be drawn and held without becoming deformed. Further, there is no necessity that motors are coupled to the rotary axes of the joint parts to maintain the position of the suction parts, and accordingly, the increase of the weight and cost of the hand can be reduced.

According to the second aspect of the present invention, when the linear drive devices move the suction parts to the surface of a workpiece, braking devices secure the position of the movable parts of the linear drive devices, and therefore, the position of the suction parts can be maintained at a position on the surface of the workpiece.

According to the third aspect of the present invention, applying air cylinders to the linear drive devices enables the movable parts of the linear drive devices to move easily in a linear direction. In particular, allowing the braking devices to stop the movable parts connected to the tip ends of piston rods of the air cylinders enables the position of the suction parts to be set at and changed to any position.

According to the fourth aspect of the present invention, even when servomotors combined with rotation-linear motion converting mechanisms are used in the linear drive devices, the position of the suction parts can be set at and changed to any position.

What is claimed is:

1. A suction-type hand comprising:
   a base part;
   at least three linear drive devices successively arranged in the base part;
   at least three link parts arranged in a series configuration, and which are each connected to movable parts of a corresponding one of the at least three linear drive devices and which are moved closer to or moved away from the base part in response to the movement of the movable parts;
   a plurality of joint parts for connecting the at least three link parts in the series configuration, and rotatably supporting the link parts;
   a static connection part connecting at least one of the at least three link parts to the base part at an end portion of the series configuration; and
   a plurality of suction parts for drawing and holding a workpiece, which are each supported by a corresponding one of the at least three link parts,
   wherein the movable parts of the at least three linear drive devices are each configured to independently move the at least three link parts to at least three different positions with respect to the base part.

2. The suction-type hand according to claim 1, wherein the linear drive devices have braking devices for stopping the movable parts.

3. The suction-type hand according to claim 1, wherein the linear drive devices have air cylinders for linearly driving the movable parts.

4. The suction-type hand according to claim 1, wherein the linear drive devices have servomotors and rotation-linear motion converting mechanisms for converting the rotation of the servomotors to the linear motion of the movable parts.

* * * * *